US012333673B2

(12) United States Patent
Dessy et al.

(10) Patent No.: US 12,333,673 B2
(45) Date of Patent: Jun. 17, 2025

(54) IMAGE PROCESSOR

(71) Applicant: INTOPIX SA, Mont-Saint-Guibert (BE)

(72) Inventors: Valentin Dessy, Mont-Saint-Guibert (BE); Gael Rouvroy, Mont-Saint-Guibert (BE); Pascal Pellegrin, Mont-Saint-Guibert (BE)

(73) Assignee: INTOPIX SA, Mont-Saint-Guibert (BE)

( * ) Notice: Subject to any disclaimer, the term of this patent is extended or adjusted under 35 U.S.C. 154(b) by 421 days.

(21) Appl. No.: 17/773,411

(22) PCT Filed: Oct. 30, 2020

(86) PCT No.: PCT/EP2020/080609
§ 371 (c)(1),
(2) Date: Apr. 29, 2022

(87) PCT Pub. No.: WO2021/084118
PCT Pub. Date: May 6, 2021

(65) Prior Publication Data
US 2023/0005103 A1    Jan. 5, 2023

(30) Foreign Application Priority Data

Oct. 30, 2019   (EP) .................................... 19206373
Dec. 23, 2019   (EP) .................................... 19219481

(51) Int. Cl.
*G06T 3/40*       (2024.01)
*G06T 3/4015*     (2024.01)
*H04N 9/64*       (2023.01)

(52) U.S. Cl.
CPC ............. *G06T 3/4015* (2013.01); *H04N 9/64* (2013.01)

(58) Field of Classification Search
CPC ................................ G06T 3/4015; H04N 9/64
See application file for complete search history.

(56) References Cited

U.S. PATENT DOCUMENTS 6,154,493 A    11/2000  Acharya et al.
6,356,276 B1    3/2002  Acharya
(Continued)

FOREIGN PATENT DOCUMENTS

EP    1176823 A1    1/2002

OTHER PUBLICATIONS

Henrique Malvar et al: "Transform, scaling & color space impact of professional extensions," Joint Video Team of ISO/IEC MPEG & ITU-T VEG, Geneva, Switzerland, May 23, 2003, pp. 1-3.
(Continued)

*Primary Examiner* — Gregory M Desire
(74) *Attorney, Agent, or Firm* — KARCESKI IP LAW, PLLC

(57) ABSTRACT

An image processor processes an image having color pixels (R, G, B) arranged in a Bayer pattern. The image processor provides a de-correlated image composed of three types of components (Y, Cr, Cb). The image processor provides a component of the first type (Y) as a substitute for a pixel of the first type (G), whereby the component of the first type (Y) is a weighted combination of a cluster of pixels that includes the pixel of the first type (G) and neighboring pixels, wherein neighboring pixels of the second and third type (R, B) have an overall positive weighting factor corresponding to an overall addition of neighboring pixels of the second and third type (R, B) to the pixel of the first type (G). The image processor also provides a component of the second type (Cr) and a component of the third type (Cb) in similar fashion.

15 Claims, 7 Drawing Sheets

(56) References Cited

U.S. PATENT DOCUMENTS

| | | | | |
|---|---|---|---|---|
| 6,392,699 | B1* | 5/2002 | Acharya | H04N 25/134 348/222.1 |
| 6,825,876 | B1 | 11/2004 | Eswar et al. | |
| 7,369,161 | B2 | 5/2008 | Eswar et al. | |
| 7,372,485 | B1 | 5/2008 | Bodnar et al. | |
| 7,480,417 | B2 | 1/2009 | Malvar | |
| 7,830,967 | B1 | 11/2010 | Jannard et al. | |
| 8,086,034 | B2* | 12/2011 | Quan | G06T 3/40 345/589 |
| 8,174,560 | B2 | 5/2012 | Jannard et al. | |
| 8,237,830 | B2* | 8/2012 | Jannard | G06T 3/4038 382/166 |
| 8,260,044 | B2* | 9/2012 | Schwartz | H04N 23/843 382/165 |
| 8,564,683 | B2 | 10/2013 | Eswar et al. | |
| 8,995,766 | B1* | 3/2015 | Peng | G06T 5/94 382/167 |
| 9,135,681 | B2* | 9/2015 | Tomaselli | G06T 5/70 |
| 9,245,314 | B2 | 1/2016 | Jannard et al. | |
| 9,262,805 | B2* | 2/2016 | Peng | G06T 3/4015 |
| 9,332,258 | B2 | 5/2016 | Pellegrin et al. | |
| 9,436,976 | B2 | 9/2016 | Jannard et al. | |
| 9,521,384 | B2 | 12/2016 | Jannard et al. | |
| 9,681,109 | B2* | 6/2017 | Siddiqui | H04N 23/72 |
| 9,716,866 | B2 | 7/2017 | Jannard et al. | |
| 10,572,974 | B2* | 2/2020 | Swami | G06T 5/50 |
| 10,582,168 | B2 | 3/2020 | Jannard et al. | |
| 10,848,730 | B2* | 11/2020 | Buettner | H04N 23/10 |
| 11,178,372 | B1* | 11/2021 | Jang | H04N 23/88 |
| 11,582,467 | B2* | 2/2023 | Nguyen | H04N 19/186 |
| 2009/0174811 | A1 | 7/2009 | Sung et al. | |

OTHER PUBLICATIONS

Henrique S. Malvar et al: "Progressive-to-Lossless Compression of Color-Filter-Array Images Using Macropixel Spectral-Spatial Transformation," Data Compression Conference, 2012, IEEE, Apr. 10, 2012, pp. 3-12.

Lee Yeejin et al: "Lossless compression of CFA sampled image using decorrelated Mallat wavelet packet decomposition," 2017 IEEE International Conference on Image Processing, IEEE, Sep. 17, 2017, pp. 2721-2725.

Menon et al: "On The Dependency Between Compression and Demosalcing in Digital Cinema," European Conference on Visual Media Production, Nov. 1, 2005, pp. 1-8.

S. H. Lee et al: "Intra prediction method based on the linear relationship between the channels for YUV 4:2:0 Intracoding," Image Processing, 16th IEEE Int. Conference, Nov. 7, 2009, pp. 1037-1040.

Suzuki Taizo: "Wavelet-Based Spectral-Spatial Transforms for CFA-Sampled Raw Camera Image Compression," IEEE Transactions on Image Processing, vol. 29, Jul. 17, 2019, pp. 433-444.

Y.H. Kim et al: "High-Fidelity RGB Video Coding Using Adaptive Inter-Plane Weighted Prediction," IEEE Transactions on Circuits and Systems for Video Technology, vol. 19, No. 7, Jul. 1, 2009, pp. 1051-1056.

International Preliminary Report on Patentability dated Mar. 3, 2022, for International Patent Application No. PCT/ EP2020/ 080609.

International Search Report dated Jan. 29, 2021, for International Patent Application No. PCT/EP2020/0808609.

* cited by examiner

304

301

700

900

302

1200

IMAGE PROCESSOR

CROSS-REFERENCE TO RELATED APPLICATION(S)

This is a National Stage Entry into the United States Patent and Trademark Office from International Patent Application No. PCT/EP2020/080609, filed on Oct. 30, 2020, which claims priority to European Patent Application No. EP 19206373.3, filed on Oct. 30, 2019, and to European Patent Application No. EP 19219481.9, filed on Dec. 23, 2019, the entire contents of all of which are incorporated herein by reference.

FIELD OF THE INVENTION

An aspect of the invention relates to an image processor adapted to process an image comprising three types of color pixels arranged in a Bayer pattern. The image processor may be used, for example, as a preprocessor in an encoding system, which enhances encoding efficiency. Further aspects of the invention relate to an encoding system, a method of processing an image, and a computer program for an image processor.

DESCRIPTION OF THE RELATED ART

U.S. Pat. No. 6,154,493 describes a technique for splitting raw image data into a plurality of channels including color plane difference channels. Each of these channels are separately compressed using a two-dimensional discrete wavelet transform. The compression utilizes quantization, whereby the recovery of the compressed channel data may yield a perceptually lossless image. The technique operates on images directly in their Bayer pattern form. Quantization thresholds are defined for the quantizing which may vary depending upon the channel and discrete wavelet transform (DWT) sub-band being processed.

SUMMARY OF THE INVENTION

There is a need for an improved image processing that allows obtaining a relatively highly decorrelated image on the basis of an image wherein color pixels are arranged in a Bayer pattern, which, in turn, allows higher coding efficiency providing a better image quality at a given compression rate.

In accordance with an aspect of the invention as defined in claim 1, there is provided an image processor adapted to process an image comprising three types of color pixels arranged in a Bayer pattern so as to obtain a de-correlated image composed of three types of components arranged in a pattern corresponding to the Bayer pattern, whereby, according to the Bayer pattern, the image is a rectangular array of blocks of 2 by 2 color pixels that comprise two diagonally disposed colors pixels of a first type, a color pixel of a second type, and a color pixel of a third type; and whereby, according to the pattern corresponding to the Bayer pattern, the de-correlated image is a rectangular array of blocks of 2 by 2 components that comprise two diagonally disposed components of a first type, a component of a second type, and a component of a third type, wherein the processor is adapted to:

provide a component of the first type in the de-correlated image as a substitute for a pixel of the first type in the image, whereby the component of the first type is a weighted combination of a cluster of pixels in the image that includes the pixel of the first type and neighboring pixels, wherein neighboring pixels of the second and third type have an overall positive weighting factor corresponding to an overall addition of neighboring pixels of the second and third type to the pixel of the first type, provide a component of the second type in the de-correlated image as a substitute for a pixel of the second type in the image, whereby the component of the second type is a weighted combination of a cluster of pixels that includes the pixel of the second type and neighboring pixels, wherein neighboring pixels of the first type have an overall negative weighting factor corresponding to an overall subtraction of neighboring pixels of the first type from the pixel of the second type; and provide a component of the third type in the de-correlated image as a substitute for a pixel of the third type in the image, whereby the component of the third type is a weighted combination of a cluster of pixels that includes the pixel of the third type and neighboring pixels, wherein neighboring pixels of the first type have an overall negative weighting factor corresponding to an overall subtraction of neighboring pixels of the first type from the pixel of the third type.

In accordance with further aspects of the invention as defined in claims 12, 14, and 15, there are provided an encoding system, a method of processing an image, and a computer program product, respectively.

An image processor as defined hereinbefore may effectively decorrelate an image comprising three types of color pixels arranged in a Bayer pattern, such as, for example, an image produced by an image sensor. The three types of color pixels may be, for example, red, green, and blue, whereby green pixels occur twice as much as red and blue pixels. As another example, the three types of color pixels may be, for example, yellow, cyan, and magenta, or may be in accordance with any other color scheme. Since the image processor efficiently decorrelates an image of the type concerned, a decorrelated image produced thereby can efficiently be encoded. This allows attaining a given image quality with an encoded image that comprises a relatively small amount of data. Stated otherwise, the encoded image has relatively good quality for a given amount of data that the encoded image may comprise. Nonetheless, the image processor need not introduce any loss of information. That is, the image in its original form may perfectly be reconstructed on the basis of the decorrelated image produced by the image processor.

For the purpose of illustration, some embodiments of the invention are described in detail with reference to accompanying drawings. In this description, additional features will be presented, some of which are defined in the dependent claims, and advantages will be apparent.

DESCRIPTION OF SOME EMBODIMENTS

Figures 1, 2:
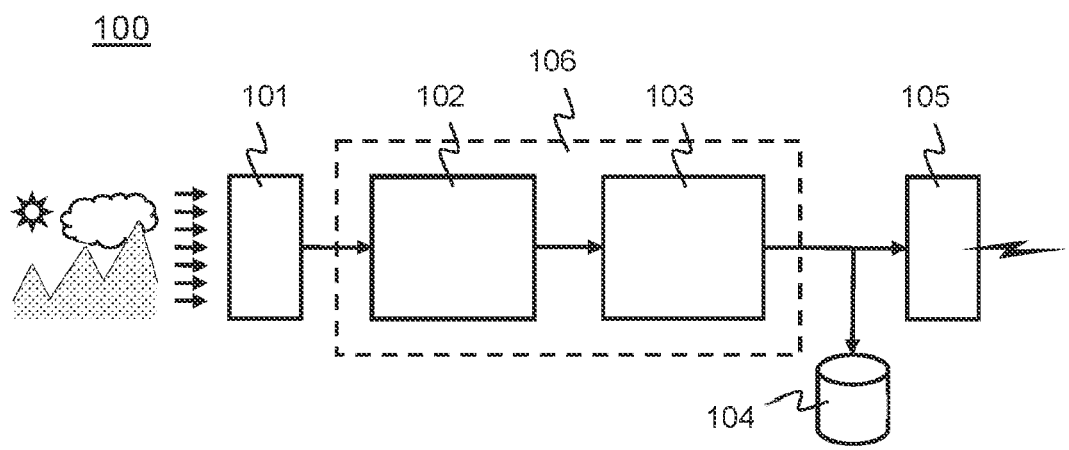
FIG. 1 is a block diagram of a camera.
FIG. 2 is a schematic diagram of a raw image provided by an image sensor in the camera.

FIG. 1 schematically illustrates a camera 100. FIG. 1 provides a block diagram of the camera 100. The camera 100 may be, for example, a photo camera or a video camera, or a combination of both that can capture an image or a video, or both, respectively. The camera 100 may further store an image or a video that has been captured, or both, in an encoded form. The camera 100 may transmit an encoded version of an image or a video that has been captured, or both. The camera 100 may be part of, for example, a smart phone or another type of electronic apparatus.

The camera 100 illustrated in FIG. 1 comprises an image sensor 101, an image processor 102, an encoder 103, a storage device 104, and a communication interface 105. The image sensor 101 may comprise three types of color pixel sensors, such as, for example, green-sensitive pixel sensors, red-sensitive pixel sensors, and blue-sensitive pixel sensors. These color pixel sensors may be arranged in a so-called Bayer pattern, whereby there are twice as much green-sensitive pixel sensors as red-sensitive pixel sensors and blue-sensitive pixel sensors.

FIG. 2 illustrates a raw image 200 that the image sensor 101 in the camera 100 may provide. FIG. 2 provides a schematic diagram of the raw image 200. The raw image 200 comprising three types of color pixels: color pixels of the first type, which are green pixels G, color pixels of the second type, which are red pixels R, and color pixels of a third type, which are blue pixels B. These color pixels are arranged in a Bayer pattern. The green pixels G occur twice as much as the red pixels R and the blue pixels B. These three types of color pixels are interleaved as illustrated in FIG. 2. As can be seen, according to the Bayer pattern, the raw image 200 is a rectangular array of blocks of 2 by 2 color pixels that comprise two diagonally disposed green pixels G, a red pixel R, and a blue pixel B.

The camera 100 basically operates as follows. The image processor 102 provides a decorrelated and wavelet filtered version of the raw image 200, which may comprise low-frequency luminance components, a set of sub-bands for high-frequency luminance components, a set of sub-bands for red-based chrominance components, and a set of sub-bands for blue-based chrominance components. The decorrelated and wavelet filtered version of the raw image 200 may comprise the same amount of information as the raw image 200. That is, the raw image 200 may be perfectly reconstructed on the basis of the decorrelated and wavelet filtered version of the raw image 200. This implies that the image processor 102 need not introduce any loss of information and thus need not introduce any loss of image quality. The image processor 102 will be described in greater detail hereinafter.

The encoder 103 encodes the decorrelated and wavelet filtered version of the raw image 200. In doing so, the encoder 103 may apply data compression and may thereby cause some loss of information and thus cause some loss of quality. For example, the encoder 103 may operate in a manner that is described in U.S. Pat. No. 9,332,258.

The image processor 102, which will be described in greater detail hereinafter, allows the encoder 103 to achieve a relatively high data compression rate for a given image quality. Stated otherwise, the image processor 102 allows the encoder 103 to provide an encoded image of relatively high quality for given data compression rate. That is, the image processor 102 contributes to achieving relatively high encoding efficiency. The image processor 102 and the encoder 103 may jointly be regarded as an encoding system 106, as indicated in FIG. 1, capable of achieving relatively high encoding efficiency. The encoding system 106 can be implemented in the form of, for example, an integrated circuit.

The storage device 104 may store an encoded image that the encoding system 106 provides. The storage device 104 may comprise, for example, a solid-state storage device or a disk-based storage device, or a combination of these as well as other types of storage devices.

The communication interface 105 may send the encoded image to an external apparatus, which may communicatively be coupled to the camera 100 via, for example, a direct communication link or a communication network. The communication interface 105 may comprise, for example, a USB port, a Bluetooth interface, or a Wi-Fi interface, or any combination of these as well as other types of communication interfaces.

A decoding system may decode the encoded image so as to obtain a copy of the raw image 200. The decoding system may be comprised in, for example, the camera 100 or an external device, or both. The decoding system is not illustrated in FIG. 1 for the sake of convenience and simplicity. In general, the decoding system may carry out operations that are inverse to the operations that the encoding system 106 carries out as described hereinbefore and as described hereinafter in greater detail.

The copy of the raw image 200 that is obtained by decoding the encoded image may undergo various image processing operations so as to obtain, for example, an image suitable for display. These image operations may include, for example, debayering, gamma correction, white balancing, and denoising. The term "debayering" designates an operation by which the Bayer pattern is effectively removed and replaced by a pattern that is suitable for a display device, such as, for example a conventional RGB pattern. An advantage of encoding the raw image 200 as described hereinbefore rather than encoding a delayered version of the raw image 200 is that less information is lost, which allows achieving higher image quality.

Figures 3, 4:
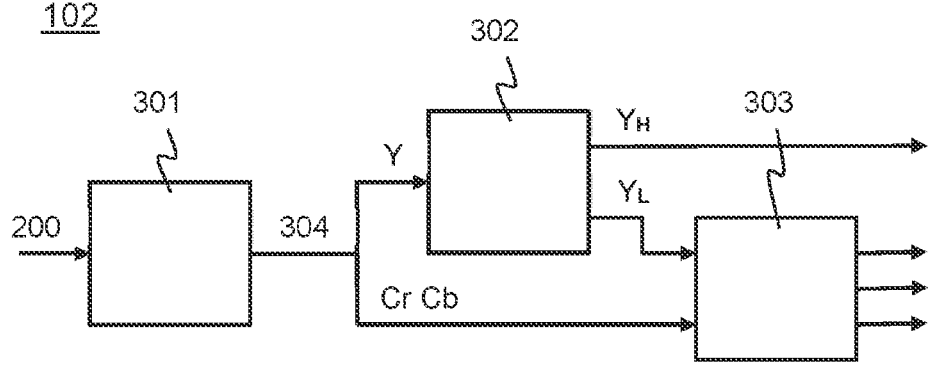
FIG. 3 is a block diagram of an image processor in the camera.
FIG. 4 is a schematic diagram of a decorrelated image provided by a decorrelation module of the image processor on the basis of the raw image.

FIG. 3 schematically illustrates the image processor 102 in the camera 100. FIG. 3 provides a block diagram of image processor 102. The image processor 102 comprises a decorrelation module 301, a quincunx wavelet filtering module 302, and a two-dimensional wavelet filtering module 303. These modules may be implemented in the form of, for example, dedicated circuits, programmable circuits, or a suitably programmed processor, or any combination of these.

The image processor 102 basically operates as follows. The decorrelation module 301 carries out various pixel substitution operations so as to obtain a decorrelated image 304 on the basis of the raw image 200. In more detail, the decorrelation module 301 substitutes green pixels G in the raw image 200 by luminance components Y. The decorrelation module 301 further substitutes red pixels R and blue pixels B in the raw image 200 by red-based chrominance components Cr and the blue-based chrominance components Cb, respectively.

FIG. 4 schematically illustrates the decorrelated image 304 that the decorrelation module 301 provides. FIG. 3 provides a schematic diagram of the decorrelated image 304. The luminance components Y, the red-based chrominance components Cr, and the blue-based chrominance components Cb are also arranged in a Bayer pattern. There are twice as much luminance components Y as there are red-based chrominance components Cr and blue-based chrominance components Cb. As can be seen, the de-correlated image 304 is a rectangular array of blocks of 2 by 2 components that comprise two diagonally disposed luminance components Y, a red-based chrominance component Cr, and a blue-based chrominance component Cb.

In more detail, a luminance component Y in the decorrelated image 304, which constitutes a substitution of a green pixel G in the raw image 200, is a weighted combination of the green pixel G concerned and neighboring pixels in the raw image 200. In the weighted combination, neighboring red and blue pixels R, B have an overall positive weighting factor. This corresponds to an overall addition of the neighboring red and blue pixels R, B to the green pixel G that is substituted. Conversely, neighboring green pixels G may have an overall negative weighting factor. This corresponds to an overall subtraction of the neighboring green pixels G from the green pixel G that is substituted.

For example, the weighted combination that provides the luminance component Y may be as follows:

$Y(i,j)=+\frac{7}{8}*G(i,j)-\frac{1}{16}*G(i-1,j-1)-\frac{1}{16}*G(i+1,j-1)-\frac{1}{16}*G(i-1,j+1)-\frac{1}{16}*G(i+1,j+1)-\frac{1}{32}*G(i-2,j)-\frac{1}{32}*G(i,j-2)-\frac{1}{32}*G(i+2,j)-\frac{1}{32}*G(i,j+2)+\frac{1}{8}*B(i,j-1)+\frac{1}{8}*B(i,j+1)+\frac{1}{8}*R(i-1,j)+\frac{1}{8}*R(i+1,j)$.

In this equation, two variables between parentheses separated by a comma denote a position of the pixels concerned in the raw image 200 illustrated in FIG. 2, whereby i and j represent the position in a horizontal and a vertical direction, respectively, of the luminance component $Y(i,j)$ that is formed and that of the green pixel $G(i,j)$ that is replaced thereby.

In this embodiment, four immediately neighboring blue and red pixels $B(i,j-1)$, $B(i,j+1)$, $R(i-1,j)$ $R(i+1,j)$ are all added to the green pixel $G(i,j)$ that is substituted. Four nearest green pixels $G(i-1, j-1)$, $G(i+1, j-1)$, $G(i-1, j+1)$, $G(i+1, j+1)$ are all subtracted from the green pixel $G(i,j)$ that is substituted. In addition, four further neighboring green pixels $G(i-2,j)$, $G(i,j-2)$, $G(i+2,j)$, $G(i,j+2)$ are also subtracted from the green pixel $G(i,j)$ that is substituted. The four nearest neighboring green pixels $G(i-1, j-1)$, $G(i+1, j-1)$, $G(i-1, j+1)$, $G(i+1, j+1)$ are in an x-configuration with respect to the green pixel $G(i,j)$ that is substituted. The four further neighboring green pixels $G(i-2,j)$, $G(i,j-2)$, $G(i+2,j)$, $G(i,j+2)$ are in an +-configuration with respect to the green pixel $G(i,j)$ that is substituted. The four nearest neighboring green pixels $G(i-1, j-1)$, $G(i+1, j-1)$, $G(i-1, j+1)$, $G(i+1, j+1)$ have a heavier weighting factor, namely $-\frac{1}{16}$, than that the four further neighboring green pixels $G(i-2,j)$, $G(i,j-2)$, $G(i+2,j)$, $G(i,j+2)$, which is $-\frac{1}{32}$.

A red-based chrominance component Cr in the decorrelated image 304, which constitutes a substitution of a red pixel R in the raw image 200, is a weighted combination of the pixel of the red pixel R concerned and neighboring pixels. In the weighted combination, neighboring green pixels G have an overall negative weighting factor. This corresponds to an overall subtraction of the neighboring green pixels G from the red pixel R that is substituted.

The weighted combination that provides the red-based chrominance component Cr may be as follows:

$Cr(i,j)=R(i,j)-\frac{1}{4}*G(i-1,j)-\frac{1}{4}*G(i,j-1)-\frac{1}{4}*G(i+1,j)-\frac{1}{4}*G(i,j+1)$.

In this equation too, the two variables between parentheses separated by a comma denote a position of the pixels concerned in the raw image 200 illustrated in FIG. 2, whereby i and j represent the position in a horizontal and a vertical direction, respectively, of the red-based chrominance component $Cr(i,j)$ that is formed and that of the red pixel $R(i,j)$ that is replaced thereby. In this embodiment, four immediately neighboring green pixels $G(i-1,j)$, $G(i,j-1)$, $G(i+1,j)$, $G(i,j+1)$ are all subtracted from the red pixel $R(i,j)$ that is substituted.

Likewise, a blue-based chrominance component Cb in the decorrelated image 304, which constitutes a substitution of a blue pixel B in the raw image 200, is a weighted combination of the blue pixel B concerned and neighboring pixels. In the weighted combination, neighboring green pixels G have an overall negative weighting factor. This corresponds to an overall subtraction of the neighboring green pixels G from the blue pixel B that is substituted.

The weighted combination that provides the blue-based chrominance component Cb may be as follows:

$Cb(i,j)=B(i,j)-\frac{1}{4}*G(i-1,j)-\frac{1}{4}*G(i,j-1)-\frac{1}{4}*G(i+1,j)-\frac{1}{4}*G(i,j+1)$.

In this equation too, two variables between parentheses separated by a comma denote a position of the pixels concerned in the raw image 200 illustrated in FIG. 2, whereby i and j represent the position in a horizontal and a vertical direction, respectively, of the blue-based chrominance component $Cb(i,j)$ that is formed and that of the blue pixel $B(i,j)$ that is replaced thereby. In this embodiment, four immediately neighboring green pixels $G(i-1,j)$, $G(i,j-1)$, $G(i+1,j)$, $G(i,j+1)$ are all subtracted from the blue pixel $B(i,j)$ that is substituted, as in the weighted combination that provides the red-based chrominance component $Cr(i,j)$ presented hereinbefore.

Figure 5:
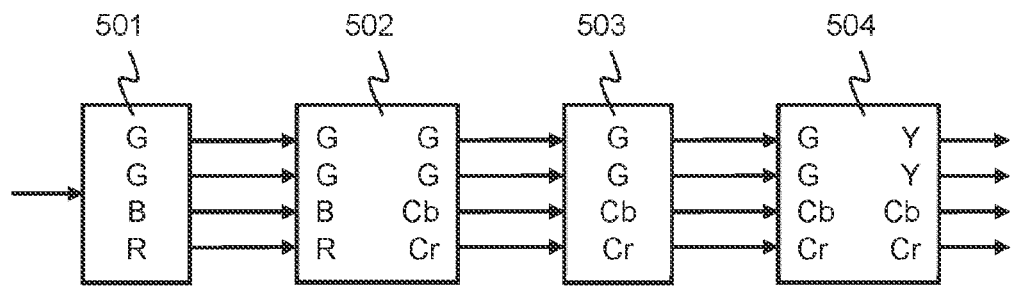
FIG. 5 is a block diagram of the decorrelation module that provides the decorrelated image.

FIG. 5 schematically illustrates an embodiment of the decorrelation module 301, which forms part of the image processor 102 illustrated in FIG. 3. FIG. 5 provides a block diagram of this embodiment of the decorrelation module 301, which will be simply referred to as the decorrelation module 301 hereinafter. The decorrelation module 301 comprises an input buffer memory 501, a chrominance component formation module 502, an intermediate buffer memory 503, and a luminance component formation module 504.

The decorrelation module 301 basically operates as follows. The input buffer memory 501 temporarily stores at least a portion of the raw image 200 illustrated in FIG. 2. The chrominance component formation module 502 retrieves from the input buffer memory 501 a red pixel R of the raw image 200, as well as four immediately neighboring green pixels G. The chrominance component formation module 502 then forms a red-based chrominance component Cr by making the weighted combination between the red pixel R and the four immediately neighboring green pixels G as indicated hereinbefore. In this manner, the chrominance component formation module 502 forms respective red-based chrominance components Cr for the decorrelated image 304, which constitute substitutions of red pixels R in the raw image 200.

The chrominance component formation module 502 forms blue-based chrominance components Cb in a similar manner. That is, the chrominance component formation module 502 retrieves from the input buffer memory 501 a blue pixel B of the raw image 200, as well as four immediately neighboring green pixels G. The chrominance component formation module 502 then forms a blue-based chrominance component Cb by making the weighted combination between the blue pixel B and the four immediately neighboring green pixels G as indicated hereinbefore.

Figure 6:
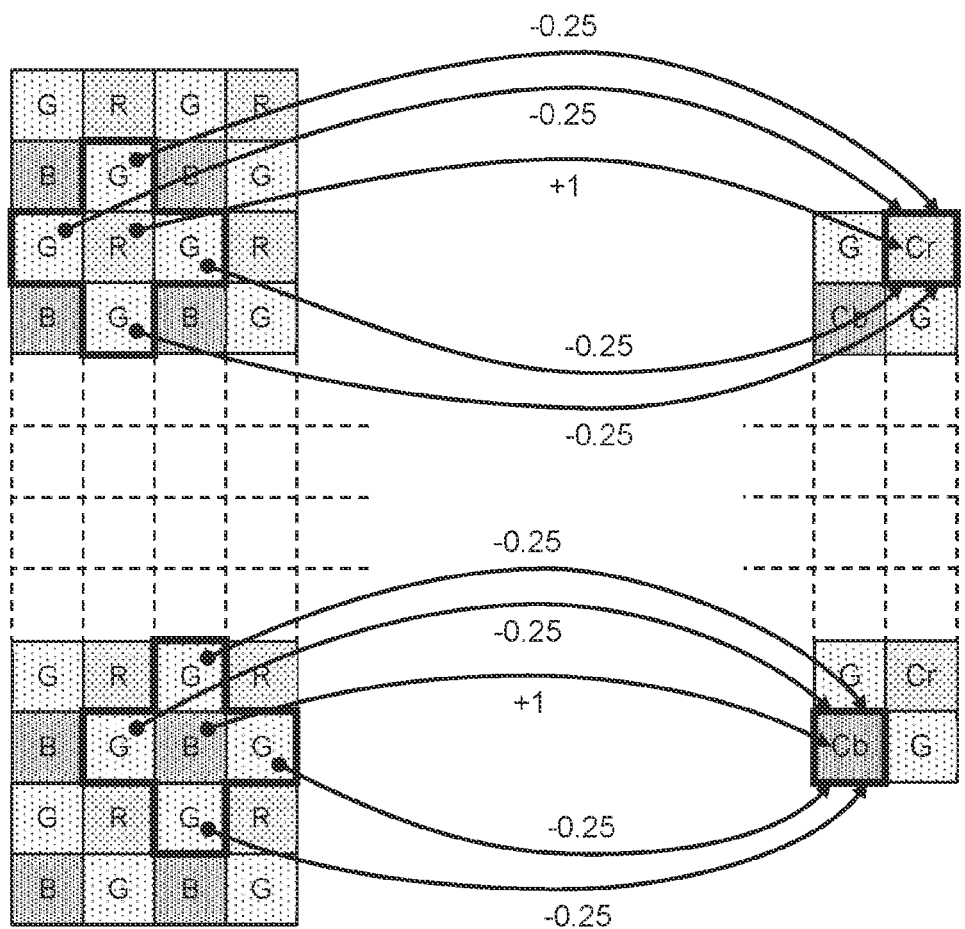
FIG. 6 is a conceptual diagram illustrating a first decorrelation operation that the decorrelation module carries out.

FIG. 6 illustrates a formation of a red-based chrominance component Cr and that of a blue-based chrominance component Cb as described hereinbefore. This may be regarded as a first decorrelation operation. FIG. 6 provides a conceptual diagram of this first decorrelation operation by means of which chrominance components Cr, Cb for the decorrelated image 304 are formed. In FIG. 6, a portion of the raw image 200 is represented in a left half of this figure, whereas a portion of the decorrelated image 304 is represented in a right half of this same figure. A red pixel R and its four immediate neighboring green pixels G in the raw image 200 are indicated, as well as a blue pixel B and its four immediately neighboring green pixels G. In addition, a red-based chrominance component Cr in the decorrelated image 304 is indicated, which constitutes a substitution of the aforementioned red pixel R, as well as a blue-based chrominance component Cb in the decorrelated image 304 is indicated, which constitutes a substitution of the aforementioned blue pixel B. Further, weighing factors are indicated, which correspond to those indicated hereinbefore.

Figures 7, 8:
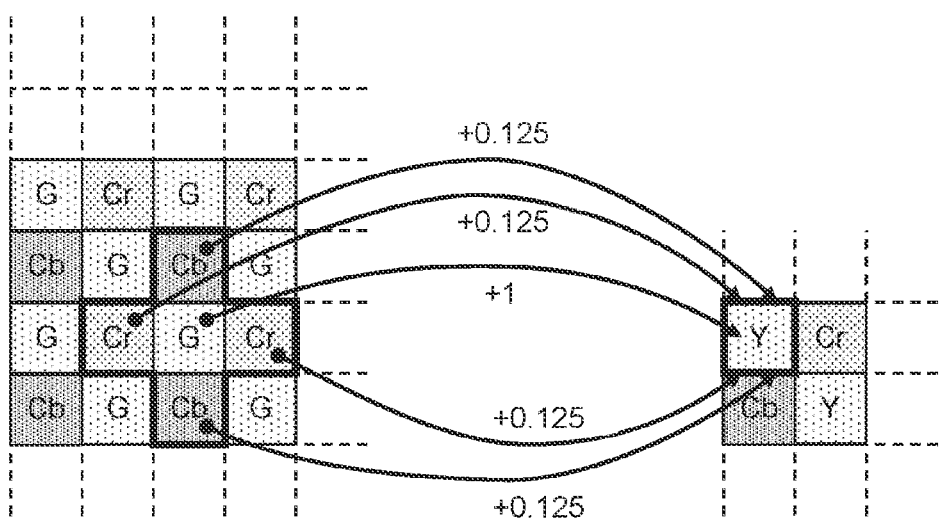
FIG. 7 is a schematic diagram of an intermediate decorrelated image obtained by first decorrelation operation.
FIG. 8 is a conceptual diagram illustrating a second decorrelation operation that the decorrelation module carries out.

FIG. 7 schematically illustrates an intermediate decorrelated image 700 provided by the chrominance component formation module 502, FIG. 7 provides a schematic diagram of the intermediate decorrelated image 700. The intermediate decorrelated image 700 corresponds with a modified version the raw image 200 in which respective red and blue pixels B have been substituted by respective red-based chrominance components Cr and respective blue-based chrominance components Cb. Green pixels G of the raw image 200 have not yet been substituted and thus remain present. At least a portion of the intermediate decorrelated image 700 is temporarily stored in the intermediate buffer memory 503 of the decorrelation module 301 illustrated in FIG. 5.

Referring again to FIG. 5, the luminance component formation module 504 retrieves from the intermediate buffer memory 503 a green pixel G in the intermediate decorrelated image 700, as well as four immediately neighboring chrominance pixels Cr, Cb, namely two red-based chrominance pixels Cr and two blue-based chrominance pixels Cb. The luminance component formation module 504 then forms a luminance component Y by making a weighted combination of the green pixel G and the four immediately neighboring chrominance pixels Cr, Cb. In this manner, the luminance component formation module 504 forms respective luminance components Y for the decorrelated image 304, which constitute substitutions of green pixels G in the raw image 200. The luminance component formation module 504 thus provides the decorrelated image 304 illustrated in FIG. 4 on the basis of the intermediate decorrelated image 700 illustrated in FIG. 6, which is temporarily stored in the intermediate buffer memory 503 of the decorrelation module 301 illustrated in FIG. 5.

FIG. 8 illustrates a formation of a luminance component Y as described hereinbefore. This may be regarded as a second decorrelation operation. FIG. 8 provides a conceptual diagram of this second decorrelation operation by means of which luminance components Y for the decorrelated image 304 are formed. In FIG. 8, a portion of the intermediate decorrelated image 700 is represented in a left half of this figure, whereas a portion of the decorrelated image 304 is represented in a right half of this same figure. A green pixel G and its four immediate neighboring chrominance components Cb, Cr in the intermediate decorrelated image 700 are indicated. In addition, a luminance component Y in the decorrelated image 304 is indicated, which constitutes a substitution of the aforementioned green pixel G. Further, weighing factors are indicated. When these are combined with the weighing factors indicated in FIG. 6, weighing factors are obtained that correspond to those indicated hereinbefore for forming the luminance components Y.

The decorrelation module 301 illustrated in FIG. 5 may work with integer numbers and round divisions that result from applying weighting factors to pixels. This allows relatively simple, low-cost implementations. There are various ways of rounding numbers. For example, the formation of a red-based chrominance component Cr and that of a blue-based chrominance component Cb could be adapted in the following manner:

$$Cb(i,j)=B(i,j)-\text{ROUNDDOWN}(\tfrac{1}{4}*G(i-1,j)+\tfrac{1}{4}*G(i,j-1)+\tfrac{1}{4}*G(i+1,j)+\tfrac{1}{4}*G(i,j+1)); \text{ and}$$

$$Cr(i,j)=R(i,j)-\text{ROUNDDOWN}(\tfrac{1}{4}*G(i-1,j)+\tfrac{1}{4}*G(i,j-1)+\tfrac{1}{4}*G(i+1,j)+\tfrac{1}{4}*G(i,j+1)).$$

Similarly, the formation of a luminance component Y could be adapted in the following manner:

$$Y(i,j)=G(i,j)+\text{ROUNDDOWN}(\tfrac{1}{8}*Cr(i-1,j)+\tfrac{1}{8}*Cb(i,j-1)+\tfrac{1}{8}*Cr(i+1,j)+\tfrac{1}{8}*Cb(i,j+1)).$$

In a decoder, a module that is the counterpart of the decorrelation module 301 could be adapted to exactly reverse the aforementioned equations by carrying out the following ones:

$$G(i,j)=Y(i,j)-\text{ROUNDDOWN}(\tfrac{1}{8}*Cr(i-1,j)+\tfrac{1}{8}*Cb(i,j-1)+\tfrac{1}{8}*Cr(i+1,j)+\tfrac{1}{8}*Cb(i,j+1));$$

$$R(i,j)=Cr(i,j)+\text{ROUNDDOWN}(\tfrac{1}{4}*G(i-1,j)+\tfrac{1}{4}*G(i,j-1)+\tfrac{1}{4}*G(i+1,j)+\tfrac{1}{4}*G(i,j+1)); \text{ and}$$

$$B(i,j)=Cb(i,j)+\text{ROUNDDOWN}(¼*G(i-1,j)+¼*G(i,j-1)+¼*G(i+1,j)+¼*G(i,j+1)).$$

In these equation ROUNDDOWN represents an operator that rounds a number down to its nearest integer.

Referring again to the image processor 102 illustrated in FIG. 3, the quincunx wavelet filtering module 302 applies a wavelet filtering operation to the luminance components Y in the decorrelated image 304 illustrated in FIG. 4. In effect, the quincunx wavelet filtering module 302 decomposes the luminance components Y into a first set of arrays of luminance components Y and into a second set of arrays of luminance components Y. The arrays of luminance components Y that belong to the first set are interleaved with the arrays of luminance components Y of the second set. For example, the first set of arrays of luminance components Y may correspond with even lines in the decorrelated image 304 illustrated in FIG. 4, whereas the second set of arrays of luminance components Y may correspond with uneven lines in the decorrelated image 304, or vice versa.

The quincunx wavelet filtering module 302 may provide high-frequency luminance components $Y_H$ for luminance components Y that belong to the first set of arrays. In that case, the quincunx wavelet filtering module 302 may provide low-frequency luminance components $Y_L$ for luminance components Y that belong to the second set of arrays. In fact, the high-frequency luminance components $Y_H$ then substitute the luminance components Y that belong to the first set of arrays. The low-luminance components $Y_L$ substitute the luminance components Y that belong to the second set of arrays.

Figures 9, 10:
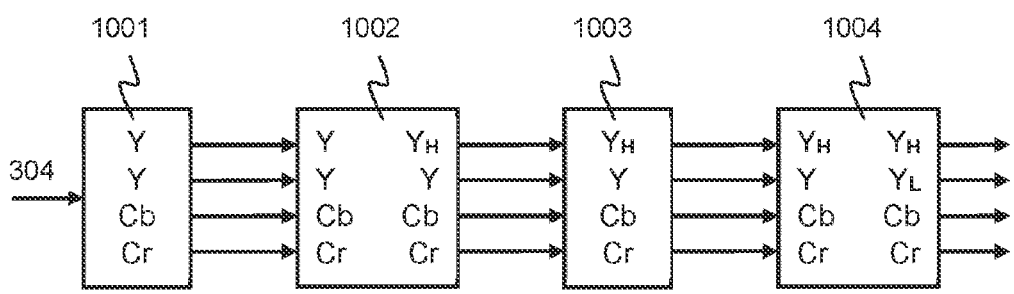
FIG. 9 is a schematic diagram of a partially wavelet filtered decorrelated image provided by a quincunx wavelet filtering module of the image processor on the basis of the decorrelated image.
FIG. 10 is a block diagram of the quincunx wavelet filtering module that provides the partially wavelet filtered decorrelated image.

FIG. 9 schematically illustrates a partially wavelet filtered decorrelated image 900 provided by the quincunx wavelet filtering module 302. FIG. 9 provides a schematic diagram of the partially wavelet filtered decorrelated image 900. In this example, even lines of the partially wavelet filtered decorrelated image 900 comprise high-frequency luminance components $Y_H$, whereas uneven lines comprise low-frequency luminance components $Y_L$. Thus, in the partially wavelet filtered decorrelated image 900, each different type of component is organized in dyadic arrays rather than in mosaic arrays. This feature may be relevant if, for example, the encoder 103 in the camera 100 illustrated in FIG. 1 has specifically been designed to handle components organized in dyadic arrays. This may be the case if, for example, the encoder 103 operates in a manner that is described in U.S. Pat. No. 9,332,258 mentioned hereinbefore.

FIG. 10 illustrates an embodiment of the quincunx wavelet filtering module 302, which forms part of the image processor 102 illustrated in FIG. 3. FIG. 10 provides a block diagram of this embodiment of the quincunx wavelet filtering module 302, which will be simply referred to as quincunx wavelet filtering module 302 hereinafter. The quincunx wavelet filtering module 302 comprises an input buffer memory 1001, a high-frequency luminance component formation module 1002, an intermediate buffer memory 1003, and a low-frequency luminance component formation module 1004.

The quincunx wavelet filtering module 302 basically operates as follows. The input buffer memory 1001 temporarily stores at least a portion of the decorrelated image 304 illustrated in FIG. 4. The high-frequency luminance component formation module 1002 retrieves from the input buffer memory 1001 a luminance component Y from the decorrelated image 304 as well as four immediately neighboring luminance components Y that are in a quincunx configuration with respect to the first-mentioned luminance component, which will be referred to as central luminance component Y hereinafter for the sake of convenience. The central luminance component Y may belong to the first set of arrays, whereas the immediately neighboring luminance components Y may belong to the second set of arrays. For example, the central luminance component Y may be present in an even line in the decorrelated image 304, whereas two of the four immediately neighboring luminance components Y may be present in an uneven line directly above the aforementioned even line, and the two other of the four immediately neighboring luminance components Y may be present in an uneven line directly below the aforementioned even line.

The high-frequency luminance component formation module 1002 forms a high-frequency luminance component $Y_H$ by making a weighted combination between the central luminance component Y, on the one hand, and the four immediately neighboring luminance components Y, on the other hand. The weighted combination may be expressed as follows:

$$Y_H(i,j)=Y(i,j)-¼*Y(i-1,j-1)-¼*Y(i+1,j-1)-¼*Y(i+1,j+1)-¼*Y(i-1,j+1),$$

wherein, like hereinbefore, the two variables between parentheses separated by a comma denote a position of the luminance components concerned in decorrelated image 304 illustrated in FIG. 4. whereby i and j represent the position in a horizontal and a vertical direction, respectively, of the high-frequency luminance component $Y_H(i,j)$ that is formed and that of the luminance component $Y(i,j)$ that is replaced thereby.

Figures 11, 12:
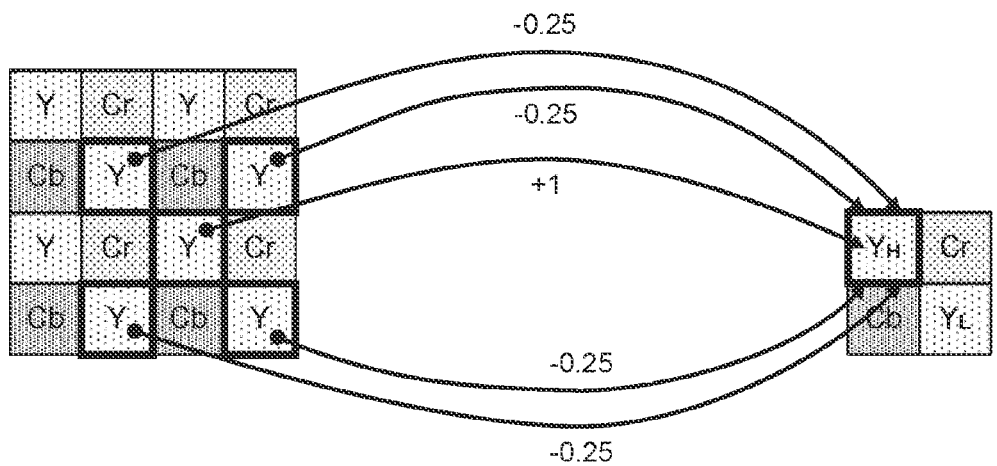
FIG. 11 is a conceptual diagram illustrating a first wavelet filtering operation that the quincunx wavelet filtering module carries out.
FIG. 12 is a schematic diagram of an intermediate partially wavelet filtered decorrelated image obtained by the first wavelet filtering operation.

FIG. 11 illustrates a formation of a high-frequency luminance component $Y_H$, which may be regarded as a first partial wavelet filtering operation. FIG. 11 provides a conceptual diagram of this first partial wavelet filtering operation by means of which high-frequency luminance components $Y_H$ for the partially wavelet filtered decorrelated image 900 are formed. In FIG. 11, a portion of the decorrelated image 304 is represented in a left half of this figure, whereas a portion of the partially wavelet filtered decorrelated image 900 is represented in a right half of this same figure. Luminance components Y that belong to the first set of arrays of luminance components Y and those that belong to the second set of arrays are indicated by different shadings in the decorrelated image 304. In this example, arrays of luminance components Y correspond with lines in the decorrelated image 304.

A luminance component Y that belongs to the first set of arrays in the decorrelated image 304 and its four immediate neighboring luminance components Y that belong to the second set of arrays are indicated in FIG. 11. In addition, a high-frequency luminance components $Y_H$ in the partially wavelet filtered decorrelated image 900 is indicated, which constitutes a substitution of the first mentioned luminance component. Further, weighing factors are indicated, which correspond to those indicated hereinbefore.

FIG. 12 schematically illustrates an intermediate partially wavelet filtered decorrelated image 1200 provided by the high-frequency luminance component formation module 1002, FIG. 12 provides a schematic diagram of the intermediate partially wavelet filtered decorrelated image 1200. This image 1200 corresponds with a modified version the decorrelated image 304 in which respective luminance components Y that belong to the first set of arrays have been substituted by respective high-frequency luminance components $Y_H$. Luminance components Y in the decorrelated image 304 that belong to the second set of arrays have not yet been substituted and thus remain present. At least a portion of the intermediate partially wavelet filtered decorrelated image 1200 is temporarily stored in the intermediate buffer memory 1003 of the quincunx wavelet filtering module 302 illustrated in FIG. 10.

Referring again to FIG. 10, the low-frequency luminance component formation module 1004 retrieves from the intermediate buffer memory 1003 a luminance component Y in the intermediate partially wavelet filtered decorrelated image 1200, as well as four immediately neighboring high-frequency luminance components $Y_H$ that are in a quincunx configuration with respect to the luminance component Y. In this example, the luminance component Y belongs to the second set of arrays, whereas the immediately neighboring high-frequency luminance components $Y_H$ have taken the place of luminance components Y belonging to the first set of arrays. For example, the luminance component Y may be present in an uneven line in the decorrelated image 304 and thus in the intermediate partially wavelet filtered version 1200 thereof, whereas two of the four immediately neighboring high-frequency luminance components $Y_H$ may be present in an even line directly above the aforementioned uneven line, and the two other of the four immediately neighboring luminance components Y may be present in an even line directly below the aforementioned uneven line.

The low-frequency luminance component formation module 1004 forms a low-frequency luminance component $Y_L$ by making a weighted combination of the luminance component Y, on the one hand, and the four immediately neighboring high-frequency luminance components $Y_H$, on the other hand. The weighted combination may be expressed as follows:

$$Y_L(i,j)=Y(i,j)+\frac{1}{8}*Y_H(i-1,j-1)+\frac{1}{8}*Y_H(i+1,j-1)+\frac{1}{8}*Y_H(i+1,j+1)+\frac{1}{8}*Y_H(i-1,j+1),$$

wherein, like hereinbefore, the two variables between parentheses separated by a comma denote a position of the luminance components concerned in the intermediate partially wavelet filtered decorrelated image 1200 illustrated in FIG. 12. whereby i and j represent the position in a horizontal and a vertical direction, respectively, of the low-frequency luminance component $Y_L(i,j)$ that is formed and that of the luminance component Y(i,j) that is replaced thereby.

Figure 13:
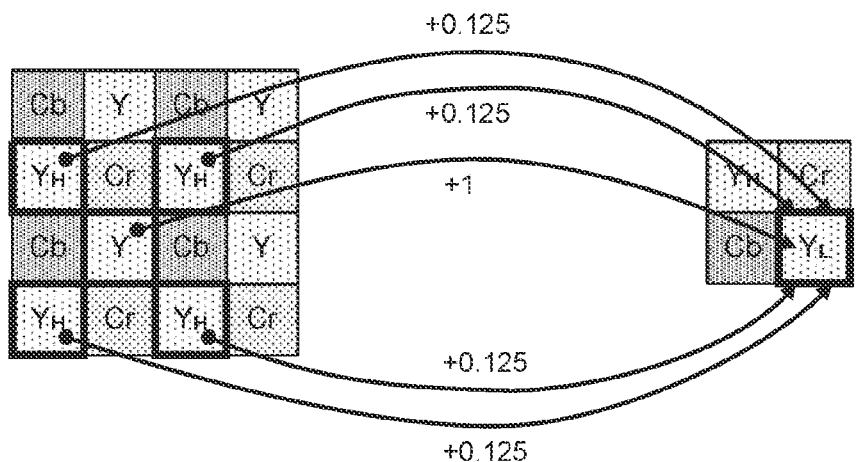
FIG. 13 is a conceptual diagram illustrating a second first wavelet filtering operation that the quincunx wavelet filtering module carries out.

FIG. 13 illustrates a formation of a low-frequency luminance component, $Y_L$ which may be regarded as a second partial wavelet filtering operation. FIG. 13 provides a conceptual diagram of this second partial wavelet filtering operation by means of which low-frequency luminance components $Y_L$ for the partially wavelet filtered decorrelated image 900 are formed. In FIG. 13, a portion of the intermediate partially wavelet filtered decorrelated image 1200 is represented in a left half of this figure, whereas a portion of the partially wavelet filtered decorrelated image 900 is represented in a right half of this same figure.

A luminance component Y in the intermediate partially wavelet filtered decorrelated image 1200 is indicated in FIG. 13, as well as its four immediate neighboring high-frequency luminance components $Y_H$. In addition, a low-frequency luminance components $Y_L$ in the partially wavelet filtered decorrelated image 900 is indicated, which constitutes a substitution of the aforementioned luminance component, Further, weighing factors are indicated, which correspond to those indicated hereinbefore.

Like the decorrelation module 301 illustrated in FIG. 5, the quincunx wavelet filtering module 302 illustrated in FIG. 10 may work with integer numbers and round divisions that result from applying weighting factors to components. This too allows relatively simple, low-cost implementations. There are various ways of rounding numbers, such as, for example, rounding down to the nearest integer as presented hereinbefore by way of example.

Referring again to the image processor 102 illustrated in FIG. 3, the two-dimensional wavelet filtering module 303 applies a two-dimensional wavelet filtering separately to the red-based chrominance components Cr, the blue-based chrominance components Cb, and the low-frequency luminance components $Y_L$ in the partially wavelet filtered decorrelated image 900 illustrated in FIG. 9. That is, the red-based chrominance components Cr in this image constitute, in effect, a sub image that undergoes the two-dimensional wavelet filtering. Similarly, the blue-based chrominance components Cb constitute, in effect, another sub image that undergoes this filtering, and the low-frequency luminance components $Y_L$ constitute yet another sub image that undergoes the two-dimensional wavelet filtering.

The two-dimensional wavelet filtering may involve two one-dimensional wavelet filtering operations that are successively carried out. One of the two one-dimensional wavelet filtering operations may be carried out in a horizontal direction, whereas the other one-dimensional wavelet filtering operation may be carried out in a vertical direction. For example, sub image components may first be applied line wise to a one-dimensional wavelet filter. This first wavelet filtering operation then produces a horizontal high-frequency sub-band and a horizontal low-frequency sub-band. Subsequently, components of the horizontal high-frequency sub-band may be applied column wise to the one-dimensional wavelet filter, which produces a horizontal high/vertical high-frequency sub-band and a horizontal high/vertical low frequency sub-band. Components of the horizontal low-frequency sub-band may be applied to the one-dimensional wavelet filter, which produces a horizontal low/vertical high-frequency sub-band and a horizontal low/vertical low frequency sub-band.

Figure 14:
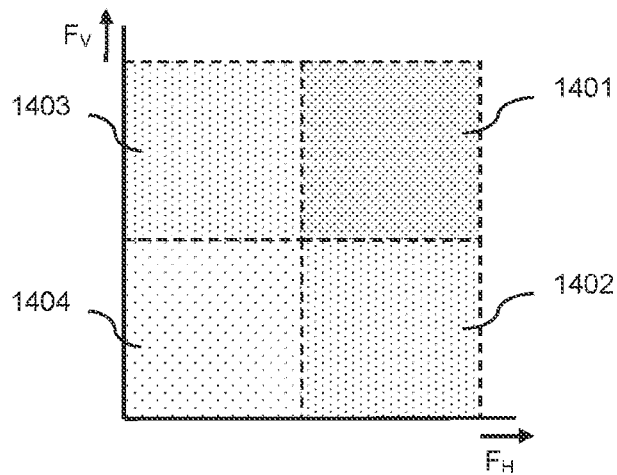
FIG. 14 is a schematic diagram of a set of sub-bands provided by a two-dimensional wavelet filtering module of the image processor on the basis of components of the same type in the partially wavelet filtered decorrelated image.

FIG. 14 illustrates a set of sub-bands provided by the two-dimensional wavelet filtering module 303. FIG. 14 is a two-dimensional frequency diagram, which has a horizontal axis representing frequency in horizontal direction FH, and a vertical axis representing frequency in vertical direction F.v. In this example, there are four sub-bands, which have been mentioned he hereinbefore: the horizontal high vertical high frequency sub-band designated by reference 1401, the horizontal high vertical low frequency sub-band designated by reference 1402, the horizontal low vertical high frequency sub-band designated by reference 1403, and the horizontal low vertical low frequency sub-band designated by reference 1404. These four sub bands results from the two-dimensional wavelet filtering of a sub image as described hereinbefore, whereby the sub image is formed by components of the same type in the partially wavelet filtered decorrelated image 900. The four of sub-bands illustrated in FIG. 14 may thus result from the red-based chrominance components Cr, the blue-based chrominance components Cb, or the low-frequency luminance components $Y_L$.

Figure 15:
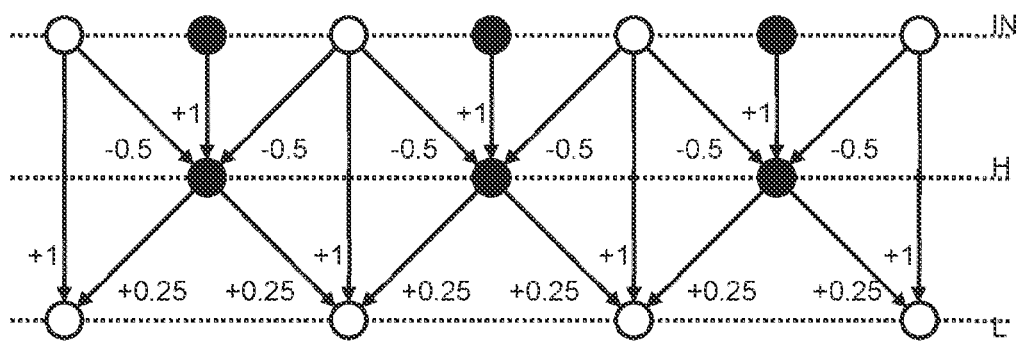
FIG. 15 is a schematic diagram of a wavelet filtering of the Le Gall 5/3 type, which may be applied by the two-dimensional wavelet filtering module and which is conceptually related to the first and the second decorrelation operations that the decorrelation module carries out, as well as to the first and second wavelet filtering operations that the quincunx wavelet filtering module carries out.

FIG. 15 illustrates a wavelet filtering of the Le Gall 5/3 type. FIG. 15 provides a conceptual diagram of this wavelet filtering. The wavelet filtering of the Le Gall 5/3 type described hereinafter with reference to FIG. 15 may correspond with the aforementioned one-dimensional wavelet filtering operations that the two-dimensional wavelet filtering module 303 carries out. Furthermore, the wavelet filtering of the Le Gall 5/3 type is conceptually related to the first and the second decorrelation operations that the decorrelation module 301 carries out, as well as to the first and second wavelet filtering operations that the quincunx wavelet filtering module 302 carries out. This will be explained in greater detail hereinafter.

The wavelet filtering of the Le Gall 5/3 type is applied to a series of input samples, which are represented as a series of relatively small circles in an upper part of FIG. 15. A portion of these small circles have a white filling, whereas another portion of these small circles have a black filling. These will be referred to hereinafter as white input samples and black input samples, respectively. The white input samples are interleaved with the black input samples as illustrated in FIG. 15. The wavelet filtering of the Le Gall 5/3 type provides high-frequency output samples for the black input samples and low-frequency output samples for the white input samples. The high-frequency output samples are represented in the middle part of FIG. 15, whereas the low-frequency output samples are represented in the lower part of this figure.

A high-frequency output sample is formed for a black input sample by making a weighted combination of the black input sample, on the one hand, and two immediately neighboring white input samples, on the other hand. In this weighted combination, the black input sample has a weighting factor of +1 and the two immediately neighboring white input samples have a weighting factor of −0.5 as indicated in FIG. 15. Thus, the weighted combination expresses a difference between the black input sample and the two immediately neighboring white input samples. The high-frequency output sample that results from this weighted combination takes, in effect, the place of the black input sample for which it is formed.

A low-frequency output sample is formed for a white input sample by making a weighted combination of the white input sample and two immediately neighboring high-frequency output samples. These two high-frequency output samples in the weighted combination take, in effect, the place of two black input samples that are immediately neighboring to the white input sample concerned, as illustrated in FIG. 15. In the weighted combination, the white input sample has a weighting factor of +1 and their immediately neighboring high-frequency output samples have a weighting factor of +0.25 as indicated in FIG. 15. Thus, the weighted combination is a weighted sum of the white input sample and the two immediately neighboring high-frequency output samples. The low-frequency output sample that results from the weighted combination takes, in effect, the place of the white input sample for which it is formed.

As mentioned hereinbefore, the first and the second decorrelation operations that the decorrelation module 301 carries out in the image processor 102, so as to form the decorrelated image 304, are conceptually related to the wavelet filtering of the Le Gall 5/3 type discussed hereinbefore. In more detail, the formation of a red-based chrominance component Cr and that of a blue-based chrominance component Cb illustrated in FIG. 6 may conceptually be regarded as a two-dimensional extension of the formation of a high-frequency output sample in the wavelet filtering of the Le Gall 5/3 type illustrated in FIG. 15, which has a one-dimensional character. Instead of taking two immediately neighboring input samples in one dimension to form a high-frequency output sample as illustrated in FIG. 15, the formation of a chrominance component involves taking four immediately neighboring pixels in two dimensions as illustrated in FIG. 6. The sum of weighing factors in the weighted combination that provides the high-frequency output sample is equal to the sum of weighing factors in the weighted combination that provides the chrominance component. In the first-mentioned weighted combination, there are two neighbors that have a weighing factor of −0.5 each; in the last-mentioned weighted combination there are four neighbors that have a weighting factor of −0.25 each.

Similarly, the formation of a luminance component Y illustrated in FIG. 8 may conceptually be regarded as a two-dimensional extension of the formation of a low-frequency output sample in the wavelet filtering of the Le Gall 5/3 type illustrated in FIG. 15, which has a one-dimensional character. Instead of taking two immediately neighboring high-frequency output samples in one dimension to form a low-frequency output sample as illustrated in FIG. 15, the formation of a luminance component Y involves taking four immediately neighboring chrominance pixels in two dimensions as illustrated in FIG. 8. Again, the sum of weighing factors in the weighted combination that provides the low-frequency output sample is equal to the sum of weighing factors in the weighted combination that provides the luminance component. In the first-mentioned weighted combination, there are two neighbors that have a weighing factor of +0.25 each; in the last-mentioned weighted combination there are four neighbors that have a weighting factor of +0.125 each.

As also mentioned hereinbefore, the first and second wavelet filtering operations that the quincunx wavelet filtering module 302 carries out in the image processor 102, so as to form the partially wavelet filtered decorrelated image 900, are conceptually related to the wavelet filtering of the Le Gall 5/3 type discussed hereinbefore. In more detail, the formation of a high-frequency luminance component $Y_H$ illustrated in FIG. 11 may conceptually be regarded as a two-dimensional extension of the formation of a high-frequency output sample in the wavelet filtering of the Le Gall 5/3 type illustrated in FIG. 15, which has a one-dimensional character. Instead of taking two immediately neighboring input samples in one dimension to form a high-frequency output sample as illustrated in FIG. 15, the formation of a high-frequency luminance component $Y_H$ involves taking four immediately neighboring luminance pixels in two dimensions as illustrated in FIG. 11. The sum of weighing factors in the weighted combination that provides the high-frequency output sample is equal to the sum of weighing factors in the weighted combination that provides the high-frequency luminance component. In the first-mentioned weighted combination, there are two neighbors that have a weighing factor of −0.5 each; in the last-mentioned weighted combination there are four neighbors that have a weighting factor of −0.25 each.

Similarly, the formation of a low-frequency luminance component $Y_L$ illustrated in FIG. 13 may conceptually be regarded as a two-dimensional extension of the formation of a low-frequency output sample in the wavelet filtering of the Le Gall 5/3 type illustrated in FIG. 15, which has a one-dimensional character. Instead of taking two immediately neighboring high-frequency output samples in one dimension to form a low-frequency output sample as illustrated in FIG. 15, the formation of a low-frequency luminance component $Y_L$ involves taking four immediately neighboring high-frequency luminance components $Y_H$ in two dimensions as illustrated in FIG. 8. Again, the sum of weighing factors in the weighted combination that provides the low-frequency output sample is equal to the sum of weighing factors in the weighted combination that provides the low-frequency luminance component. In the first-mentioned weighted combination, there are two neighbors that have a weighing factor of +0.25 each; in the last-mentioned weighted combination there are four neighbors that have a weighting factor of +0.125 each.

In the camera 100 illustrated in FIG. 1, the image processor 102 thus processes the raw image 200 illustrated in FIG. 2 to obtain the partially wavelet filtered decorrelated image 900 illustrated in FIG. 10, which may be regarded as a combination of four sub images: a sub image comprising high-frequency luminance components $Y_H$, a sub image comprising low-frequency luminance components $Y_L$, a sub image comprising red-based chrominance components Cr, and a sub image comprising blue-based chrominance components Cb. In addition, the image processor 102 provides a set of four sub-bands as illustrated in FIG. 14 for each of the three last-mentioned sub images. The encoder 103 may then efficiently encode following data that may represent the raw image 200 illustrated in FIG. 2 without any loss of information: the high-frequency luminance components $Y_H$, the four sub-bands that represent the low-frequency luminance components $Y_L$, the four sub-bands that represent red-based chrominance components Cr, and the four sub-bands that represent the blue-based chrominance components Cb.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to image processing, or video processing, or both. The presented embodiments provide an example of the invention being applied for image and video compression. However, the invention may be applied for other types of image and video processing, such as, for example, providing a multi-resolution view of an image for segmented storage and/or transport of the image, analysis of images to detect objects/properties in the image or achieve segmentation, and as an analysis filter for a debayering algorithm.

There are numerous different ways of implementing an image processor in accordance with the invention. Any of the modules in the presented embodiments may be implemented by means of an electrical circuit, which may be dedicated or programmable, or by means of a suitably programmed processor, or a combination thereof. A computer program may define one or more operations carried out by the image processor, which have been described with reference to FIGS. 1-15. In this respect, the block diagrams may each also be regarded, at least partially, as representing a flow chart diagram of such a computer program, as well as representing a method that a processor may carry out when executing the computer program. For example, the decorrelation module illustrated in FIG. 5 may be regarded as representing a decorrelation step. Similarly, other modules may be regarded as representing steps of a method.

There are numerous different ways of implementing decorrelating pixel-component transformation schemes in a product or method accordance with the invention. In the presented embodiments, a pixel-component transformation scheme is applied that is conceptually related to the wavelet filtering of the Le Gall 5/3 type as explained hereinbefore. More specifically, in this conceptual relationship, the pixels of the second and third type, which are the red and blue pixels in the presented embodiments, may be considered as samples for which high-frequency components are provided using a two-dimensional filter kernel that, in effect, is an extension of a one-dimensional kernel of the wavelet filtering concerned, whereby a correction of weighting factors is applied. The pixels of the first type, which are the green pixels in the presented embodiments, may be considered as samples for which low-frequency components are provided, again using a two-dimensional filter kernel that, in effect, is an extension of a one-dimensional kernel of the wavelet filtering concerned, whereby a correction of weighting factors is applied.

In other embodiments, a pixel-component transformation scheme may be based on a wavelet filtering of a different type, such as, for example, a wavelet filtering of the Daubechies 9/7 type, or a 13/7 based wavelet filtering. A pixel-component transformation scheme based on one of the aforementioned types of wavelet filtering may be more complex to implement that the pixel-component transformation scheme in the presented embodiments. For example, a pixel-component transformation scheme that is based on the wavelet filtering of the Daubechies 9/7 type may involve more partial decorrelation operations than the first and second decorrelation operations described hereinbefore with reference to FIGS. 5-8. That is, a decorrelation module based on the wavelet filtering of the Daubechies 9/7 type may require more functional blocks that the decorrelation module 301 illustrated in FIG. 5.

A pixel-component transformation scheme that is based on a wavelet filtering of a type that is more complex than the wavelet filtering of the Le Gall 5/3 type, will provide more complex weighted combinations that define components replacing pixels. This is because more neighboring pixels will be taken into account to form a component that replaces a pixel. A general rule regarding weighted combinations that has been indicated hereinbefore and that is defined in the appended claims will nonetheless still apply. Namely, in a weighted combination that provides a component of a first type, neighboring pixels of the second and third type have an overall positive weighting factor corresponding to an overall addition of the neighboring pixels of the second and third type to a pixel of the first type that is substituted. Conversely, in a weighted combination that provides a component of a second or third type, neighboring pixels of the first type have an overall negative weighting factor corresponding to an overall subtraction of the neighboring pixels of the first type from a pixel of the second or third type, respectively, that is substituted.

It should further be noted that there are numerous different manners of implementing a decorrelating pixel-component transformation scheme that is conceptually related to a particular type of wavelet filtering, such as, for example, the Le Gall 5/3 type wavelet filtering. For example, the presented embodiments describe an implementation that may be simplified as follows. A weighted combination that provides a red-based chrominance component Cr is simplified by taking into account pixels on two consecutive lines only. In case the red pixel R(i,j) is on a lower of the two consecutive lines, the weighted combination may be expressed as follows:

$$Cr(i,j)=R(i,j)-\tfrac{1}{4}*G(i-1,j)-\tfrac{1}{2}*G(i,j-1)-\tfrac{1}{4}*G(i+1,j).$$

Referring to FIG. 6, in that case, the green pixel G that is immediately below the red pixel R that is substituted by the red-based chrominance component Cr is omitted. This omission is compensated for by doubling the weighting factor for the green pixel G that is immediately above the red pixel R, which thus becomes −0.5 instead of −0.25. This is equivalent to horizontally mirroring, as it were, the aforementioned green pixel G so that this same pixel is also immediately below the red pixel R, thereby taking the place of the green pixel G that is omitted.

In case the red pixel R(i,j) is on an upper of the two consecutive lines, the weighted combination may be expressed as follows:

$$Cr(i,j)=R(i,j)-¼*G(i-1,j)-¼*G(i+1,j)-½*G(i,j+1).$$

Referring to FIG. 6, in that case, the green pixel G that is immediately above the red pixel R that is substituted by the red-based chrominance component Cr is omitted. This omission is compensated for by doubling the weighting factor for the green pixel G that is immediately below the red pixel R, which thus becomes −0.5 instead of −0.25.

In the same manner, a weighted combination that provides a blue-based chrominance component Cb is simplified by taking into account pixels on two consecutive lines only. In case the blue pixel B(i,j) is on a lower of the two consecutive lines, the weighted combination may be expressed as follows:

$$Cb(i,j)=B(i,j)-¼*G(i-1,j)-½*G(i,j-1)-¼*G(i+1,j).$$

Referring to FIG. 6, in that case, the green pixel G that is immediately below the blue pixel B that is substituted by the blue-based chrominance component Cb is omitted. This omission is compensated for by doubling the weighting factor for the green pixel G that is immediately above the blue pixel B, which thus becomes −0.5 instead of −0.25.

In case the blue pixel B(i,j) is on an upper of the two consecutive lines, the weighted combination may be expressed as follows:

$$Cb(i,j)=B(i,j)-¼*G(i-1,j)-¼*G(i+1,j)-½*G(i,j+1).$$

Referring to FIG. 6, in that case, the green pixel G that is immediately above the blue pixel B that is substituted by the blue-based chrominance component Cb is omitted. This omission is compensated for by doubling the weighting factor for the green pixel G that is immediately below the blue pixel B, which thus becomes −0.5 instead of −0.25.

A weighted combination that provides a luminance component Y can similarly be simplified by taking into account pixels and chrominance components on two consecutive lines only in the intermediate decorrelated image 700 illustrated in FIG. 7. In case the luminance pixel Y(i,j) and the green pixel G(i,j) that is replaced are on a lower of the two consecutive lines, with horizontally adjacent blue-based chrominance components Cb and vertically adjacent red-based chrominance components Cr, the weighted combination may be expressed as follows:

$$Y(i,j)=G(i,j)+⅛*Cb(i-1,j)+¼*Cr(i,j-1)+⅛*Cb(i+1,j).$$

In a variant of the case hereinbefore with horizontally adjacent red-based chrominance components Cr and vertically adjacent blue-based chrominance components Cb the weighted combination may be expressed as follows:

$$Y(i,j)=G(i,j)+⅛*Cr(i-1,j)+¼*Cb(i,j-1)+⅛*Cr(i+1,j).$$

Referring to FIG. 8, in the latter case, the blue-based chrominance component Cb that is immediately below the green pixel G that is substituted by the luminance component Y is omitted. This omission is compensated for by doubling the weighting factor for the blue-based chrominance component Cb that is immediately above the green pixel G, which thus becomes +0.25 instead of +0.125. This is equivalent to horizontally mirroring, as it were, the aforementioned blue-based chrominance component Cb so that this same component is also immediately below the green pixel G, thereby taking the place of the blue-based chrominance component Cb that is omitted.

In case the luminance pixel Y(i,j) and the green pixel G(i,j) that is replaced are on an upper of the two consecutive lines, with horizontally adjacent blue-based chrominance components Cb and vertically adjacent red-based chrominance components Cr, the weighted combination may be expressed as follows:

$$Y(i,j)=G(i,j)+⅛*Cb(i-1,j)+⅛*Cb(i+1,j)+¼*Cr(i,j+1).$$

In a variant of the case hereinbefore with horizontally adjacent red-based chrominance components Cr and vertically adjacent blue-based chrominance components Cb the weighted combination may be expressed as follows:

$$Y(i,j)=G(i,j)+⅛*Cr(i-1,j)+⅛*Cr(i+1,j)+¼*Cb(i,j+1).$$

Referring to FIG. 8, in the latter case, the blue-based chrominance component Cb that is immediately above the green pixel G that is substituted by the luminance component Y is omitted. This omission is compensated for by doubling the weighting factor for the blue-based chrominance component Cb that is immediately below the green pixel G, which thus becomes +0.25 instead of +0.125.

The wavelet filtering operation that is applied to luminance components Y by the quincunx wavelet filtering module 302 illustrated in FIG. 10, can be simplified in a similar manner. That is, a simplified wavelet filtering operation may take into account the luminance components on two consecutive lines only in the decorrelated image 304 illustrated in FIG. 4. Referring to FIG. 11, this may imply ignoring the luminance components Y that are on a line immediately below the luminance component Y for which the high-frequency luminance component $Y_H$ is formed. In that case, the weighting factor for the remaining luminance components Y, which are on a line immediately above the luminance component Y for which the high-frequency luminance component $Y_H$ is formed, may be doubled to become −0.5 instead of −0.25. Conversely, simplification may imply ignoring the luminance components Y that are on a line immediately above the luminance component Y for which the high-frequency luminance component $Y_H$ is formed. In that case, the weighting factor for the remaining luminance components Y is doubled too.

The wavelet filtering operation applied by the quincunx wavelet filtering module 302 can further be simplified by taking into account luminance components Y and high-frequency luminance component $Y_H$ on two consecutive lines only in the intermediate partially wavelet filtered decorrelated image 1200 illustrated in FIG. 12. Referring to FIG. 13, such a simplification may imply ignoring the high-frequency luminance components $Y_H$ that are on a line immediately below the luminance component Y for which the low-frequency luminance component $Y_L$ is formed. In that case, the weighting factor for the remaining high-frequency luminance components $Y_H$, which are on a line immediately above the luminance component Y for which the low-frequency luminance component $Y_L$ is formed, may be doubled to become +0.25 instead of +0.125. Conversely, the simplification may imply ignoring the high-frequency luminance components $Y_H$ that are on a line immediately above the luminance component Y for which the high-frequency luminance component $Y_H$ is formed. In that case, the weighting factor for the remaining luminance components Y is doubled too.

The remarks presented hereinbefore illustrate that there are numerous different ways of implementing a decorrelating pixel-component transformation in accordance with the invention. The transformation can be applied in a perfectly reversible manner or in a non-perfectly reversible manner. For example, in video encoding with a relatively low compression ratio, a perfectly reversible transform may be preferred for high quality. Conversely, in video encoding with a relatively high compression ratio, a non-perfectly reversible transform may be acceptable and even preferred.

In another aspect, there are numerous different ways of implementing a wavelet filtering operation that is applied to luminance components Y in a product or method in accordance with the invention. In the presented embodiments, there is a line-wise decomposition of luminance components Y into a first set of arrays and into a second set of arrays. In other embodiments, this decomposition may be column-wise. More generally, it is possible to implement a column-wise processing instead of a line-wise processing as indicated hereinbefore and in the presented embodiments.

In general, there are numerous different ways of implementing the invention, whereby different implementations may have different topologies. In any given topology, a single entity may carry out several functions, or several entities may jointly carry out a single function. In this respect, the drawings are very diagrammatic.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. An image processor configured to process an image comprising pixels of three different colors (R, G, B) arranged in a Bayer pattern so as to obtain a de-correlated image composed of components of three different types (Y, Cr, Cb) arranged in a pattern corresponding to the Bayer pattern,
   whereby, according to the Bayer pattern, the image is a rectangular array of blocks of 2 by 2 pixels that comprise two diagonally disposed pixels of a first color (G), a pixel of a second color (R), and a pixel of a third color (B); and
   whereby, according to the pattern corresponding to the Bayer pattern, the de-correlated image is a rectangular array of blocks of 2 by 2 components that comprise two diagonally disposed components of a first type (Y), a component of a second type (Cr), and a component of a third type (Cb),
   wherein the processor is configured to:
   provide a component of the first type (Y) in the de-correlated image as a substitute for a pixel of the first color (G) in the image, whereby the component of the first type (Y) is a weighted combination of a cluster of pixels in the image that includes the pixel of the first color (G) and neighboring pixels, wherein neighboring pixels of the second and third color (R, B) have an overall positive weighting factor corresponding to an overall addition of neighboring pixels of the second and third color (R, B) to the pixel of the first color (G),
   provide a component of the second type (Cr) in the de-correlated image as a substitute for a pixel of the second color (R) in the image, whereby the component of the second type (Cr) is a weighted combination of a cluster of pixels in the image that includes the pixel of the second color (R) and neighboring pixels, wherein neighboring pixels of the first color (G) have an overall negative weighting factor corresponding to an overall subtraction of neighboring pixels of the first color (G) from the pixel of the second color (R), and
   provide a component of the third type (Cb) in the de-correlated image as a substitute for a pixel of the third color (B) in the image, whereby the component of the third type (Cb) is a weighted combination of a cluster of pixels in the image that includes the pixel of the third color (B) and neighboring pixels, wherein neighboring pixels of the first color (G) have an overall negative weighting factor corresponding to an overall subtraction of neighboring pixels of the first color (G) from the pixel of the third color (B),
   wherein the weighted combination that forms the component of the first type (Y) comprises:
   nearest neighboring pixels of the first color (G) that are in an x-configuration with respect to the pixel of the first color that is substituted, and
   further neighboring pixels of the first color that are in an +-configuration with respect to the pixel of the first color that is substituted.

2. An image processor according to claim 1, wherein the image processor is configured to:
   first provide respective components of the second type (Cr) as substitutes of respective pixels of the second color (R) and to provide respective components of the third type (Cb) as substitutes of respective pixels of the third color (B), and, subsequently, to
   provide respective components of the first type (Y) as substitutes of respective pixels of the first color (G), whereby a component of the first type (Y) is provided on the basis of a weighed combination of, on the one hand, the pixel of the first color (G) for which the component of the first type is a substitute and, on the other hand, components of the second type (Cr) and components of the third type (Cb) that have been provided as substitutes for pixels of the second color and for pixels of the third color, respectively, that form a cluster with the pixel of the first color.

3. An image processor according to claim 1, wherein the nearest neighboring pixels of the first color (G) that are in an x-configuration have a heavier weighting factor in the weighted combination than the further neighboring pixels of the first color that are in an +-configuration.

4. An image processor according to claim 3, wherein, in the weighted combination that forms the component of the first type (Y):
   the pixel of the first color (G) that is substituted has a weighting factor of $+7/8$;
   the nearest neighboring pixels of the first color that are in an x-configuration have a weighting factor of $-1/16$;
   the further neighboring pixels of the first color that are in an +-configuration have a weighting factor of $-1/32$; and
   the neighboring pixels of the second color (R) and the neighboring pixels of the third color (B) have a weighting factor of $+1/8$.

5. An image processor according to claim 1, wherein, in the weighted combination that forms the component of the second type (Cr):
the pixel of the second color (R) that is substituted has a weighting factor of +1; and
the neighboring pixels of the first color (G) are four immediately neighboring pixels of the first color that have a weighing factor of −¼.

6. An image processor according to claim 1, wherein, in the weighted combination that forms the component of the third type (Cb):
the pixel of the third color (B) that is substituted has a weighting factor of +1; and
the neighboring pixels of the first color (G) are four immediately neighboring pixels of the first color that have a weighing factor of −¼.

7. An image processor according to claim 1, wherein the image processor is configured to apply a wavelet-based filtering to components of the first type (Y) in the de-correlated image so as to obtain high frequency components of the first type ($Y_H$) and low frequency components of the first type ($Y_L$), the wavelet-based filtering involving a decomposition of the components of the first type (Y) into a first set of arrays of components of the first type and a second set of arrays of components of the first type, the arrays of components of the first type that belong to the first set being interlaced with the arrays of components of the first type that belong to the second set, whereby the high frequency components of the first type ($Y_H$) are provided for the components of the first type that belong to the first set of arrays and whereby the low frequency components of the first type ($Y_L$) are provided for the components of the first type that belong to the second set of arrays.

8. An image processor according to claim 7, wherein a high frequency component of the first type ($Y_H$) is a weighted combination between a component of the first type belonging to the first set of arrays and neighboring components of the first type belonging to the second set of arrays, and wherein a low frequency component of the first type ($Y_L$) is a weighed sum of a component of the first type belonging to the second set of arrays and neighboring high-frequency components.

9. An image processor according to claim 8, wherein:
in the weighted combination that forms the high frequency component of the first type ($Y_H$), the component of the first type belonging to the first set of arrays has a weighting factor of +1 and the neighboring components of the first type belonging to the second set of arrays have a weighting factor of −¼; and
in the weighed sum that forms the low frequency component of the first type ($Y_L$), the component of the first type belonging to the second set of arrays has a weighting factor of +1 and neighboring high-frequency components have a weighting factor of +⅛.

10. An image processor according to claim 7, wherein the processor is configured to apply a two-dimensional wavelet-based filtering to the low frequency components of the first type ($Y_L$), to the components of the second type (Cr) in the decorrelated image, and to the components of the third type (Cb) in the decorrelated image.

11. An encoding system comprising an image processor according to claim 1 and an encoder configured to encode at least one of the following: the de-correlated image and a wavelet-based filtered version of the de-correlated image.

12. An encoding system according to claim 11, wherein the encoder is configured to encode:
the high frequency components of the first type ($Y_H$);
sub bands produced obtained by applying the two-dimensional wavelet-based filtering to the low frequency components of the first type ($Y_L$);
sub bands produced obtained by applying the two-dimensional wavelet-based filtering to, the components of the second type (Cr) in the decorrelated image; and
sub bands produced obtained by applying the two-dimensional wavelet-based filtering to the components of the third type (Cb) in the decorrelated image,
wherein the processor is configured to apply a two-dimensional wavelet-based filtering to the low frequency components of the first type ($Y_L$), to the components of the second type (Cr) in the decorrelated image, and to the components of the third type (Cb) in the decorrelated image.

13. An inversely-operating image processor configured to process the de-correlated image produced by the image processor according to claim 1, the inversely-operating image processor being configured to reconstitute the image comprising the pixels of three different colors (R, G, B) that are arranged in the Bayer pattern.

14. A method of processing an image comprising pixels of three different colors (R, G, B) arranged in a Bayer pattern so as to obtain a de-correlated image composed of components of three different types (Y, Cr, Cb) arranged in a pattern corresponding to the Bayer pattern,
whereby, according to the Bayer pattern, the image is a rectangular array of blocks of 2 by 2 pixels that comprise two diagonally disposed pixels of a first color (G), a pixel of a second color (R), and a pixel of a third color (B); and
whereby, according to the pattern corresponding to the Bayer pattern, the de-correlated image is a rectangular array of blocks of 2 by 2 components that comprise two diagonally disposed components of a first type (Y), a component of a second type (Cr), and a component of a third type (Cb),
wherein the method comprises:
providing a component of the first type (Y) in the de-correlated image as a substitute for a pixel of the first color (G) in the image, whereby the component of the first type (Y) is a weighted combination of a cluster of pixels in the image that includes the pixel of the first color (G) and neighboring pixels, wherein neighboring pixels of the second and third color (R, B) have an overall positive weighting factor corresponding to an overall addition of neighboring pixels of the second and third color (R, B) to the pixel of the first color (G),
providing a component of the second type (Cr) in the de-correlated image as a substitute for a pixel of the second color (R) in the image, whereby the component of the second type (Cr) is a weighted combination of a cluster of pixels in the image that includes the pixel of the second color (R) and neighboring pixels, wherein neighboring pixels of the first color (G) have an overall negative weighting factor corresponding to an overall subtraction of neighboring pixels of the first color (G) from the pixel of the second color (R), and
providing a component of the third type (Cb) in the de-correlated image as a substitute for a pixel of the third color (B) in the image, whereby the component of the third type (Cb) is a weighted combination of a cluster of pixels in the image that includes the pixel of the third color (B) and neighboring pixels, wherein neighboring pixels of the first color (G) have an overall negative weighting factor corresponding to an overall subtraction of neighboring pixels of the first color (G) from the pixel of the third color (B), wherein the weighted combination that forms the component of the first type (Y) comprises:

nearest neighboring pixels of the first color (G) that are in an x-configuration with respect to the pixel of the first color that is substituted, and further neighboring pixels of the first color that are in an +-configuration with respect to the pixel of the first color that is substituted.

15. A non-transitory machine readable storage medium on which a computer program is stored, the computer program comprising a set of instructions that enables an image processor to carry out the method according to claim 14.

* * * * *